(12) United States Patent
Mudra et al.

(10) Patent No.: US 10,598,088 B2
(45) Date of Patent: Mar. 24, 2020

(54) SWITCH VALVE FOR CONTROLLING A HYDRAULIC FLUID FLOW FOR A CONNECTING ROD OF VARIABLE COMPRESSION INTERNAL COMBUSTION ENGINE AND CONNECTING ROD

(71) Applicant: ECO Holding 1 GmbH, Marktheidenfeld (DE)

(72) Inventors: Alexander Mudra, Marktheidenfeld (DE); Wolfgang Rupp, Faulbach (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 100 days.

(21) Appl. No.: 16/016,923

(22) Filed: Jun. 25, 2018

(65) Prior Publication Data
US 2018/0371987 A1 Dec. 27, 2018

(30) Foreign Application Priority Data

Jun. 27, 2017 (DE) .......................... 10 2017 114 263
Mar. 26, 2018 (DE) .......................... 10 2018 107 076

(51) Int. Cl.
*F02B 75/04* (2006.01)
*F16K 31/36* (2006.01)
(Continued)

(52) U.S. Cl.
CPC .......... *F02B 75/045* (2013.01); *F15B 15/202* (2013.01); *F16K 11/0716* (2013.01); *F16K 31/363* (2013.01)

(58) Field of Classification Search
CPC ...... F02B 75/045; F02B 75/32; F15B 15/202; F15B 15/14; F15B 15/1457; F16K 11/0716; F16K 31/363; F16K 31/22; F16K 11/07
See application file for complete search history.

(56) References Cited

U.S. PATENT DOCUMENTS

| 2016/0169099 A1* | 6/2016 | Schaffrath ............. F02B 75/045 |
| | | 123/197.3 |
| 2017/0022895 A1* | 1/2017 | Balling .................. F16K 27/041 |
| 2017/0082021 A1 | 3/2017 | Schaffrath et al. |

FOREIGN PATENT DOCUMENTS

| DE | 102013107127 A1 | 1/2015 |
| DE | 102010215241 A1 | 6/2016 |

(Continued)

*Primary Examiner* — Syed O Hasan
(74) *Attorney, Agent, or Firm* — Von Rohrscheidt Patents (57) ABSTRACT

A switch valve for controlling a hydraulic fluid flow of a connecting rod for an internal combustion engine with variable compression with an eccentrical element adjustment arrangement for adjusting an effective connecting rod length, the eccentrical element adjustment arrangement including a first cylinder including a first hydraulic chamber; a second cylinder including a second hydraulic chamber, wherein the first cylinder includes a first inlet for feeding hydraulic fluid into the first cylinder from a supply and the second cylinder includes a second inlet for feeding hydraulic fluid into the second cylinder from the supply, wherein the first cylinder includes a first drain for draining the hydraulic fluid from the first cylinder and the second cylinder includes a second drain for draining the hydraulic fluid from the second cylinder, wherein the switch valve includes a step piston which is displaceable into a first switching position or a second switching position.

14 Claims, 7 Drawing Sheets

(51) Int. Cl.
　　　*F16K 31/363*　　　(2006.01)
　　　*F16K 11/07*　　　(2006.01)
　　　*F15B 15/20*　　　(2006.01)

(56) References Cited

FOREIGN PATENT DOCUMENTS

| | | |
|---|---|---|
| DE | 102014220175 A1 | 5/2017 |
| DE | 102016107986 A1 | 5/2017 |
| WO | WO2016096381 A1 | 6/2016 |
| WO | 102015111175 A1 | 9/2016 |

* cited by examiner

SWITCH VALVE FOR CONTROLLING A HYDRAULIC FLUID FLOW FOR A CONNECTING ROD OF VARIABLE COMPRESSION INTERNAL COMBUSTION ENGINE AND CONNECTING ROD

RELATED APPLICATIONS

This application claims priority from and incorporates by reference German patent applications
DE 10 2017 114 263.0 filed on Jun. 27, 2017, and
DE 10 2018 107 076.4 filed on Mar. 26, 2018.

FIELD OF THE INVENTION

The invention relates to a switch valve for controlling a hydraulic fluid flow for a connecting rod of a variable compression internal combustion engine and to a connecting rod with the switch valve.

BACKGROUND OF THE INVENTION

In internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod length are known.

BRIEF SUMMARY OF THE INVENTION

Thus, it is an object of the invention to provide a switch valve for a connecting rod for an internal combustion engine with variable compression with an eccentrical element adjustment arrangement for adjusting an effective connecting rod length so that ease of manufacture is improved. By the same token hydraulic actuation of the switch valve shall be improved.

It is another object of the invention to provide an improved connecting rod with the switch valve.

The object is achieved by a switch valve for controlling a hydraulic fluid flow of a connecting rod for an internal combustion engine with variable compression with an eccentrical element adjustment arrangement for adjusting an effective connecting rod length, the eccentrical element adjustment arrangement including a first cylinder including a first hydraulic chamber; a second cylinder including a second hydraulic chamber, wherein the first cylinder includes a first inlet for feeding hydraulic fluid into the first cylinder from a supply and the second cylinder includes a second inlet for feeding hydraulic fluid into the second cylinder from the supply, wherein the first cylinder includes a first drain for draining the hydraulic fluid from the first cylinder and the second cylinder includes a second drain for draining the hydraulic fluid from the second cylinder, wherein the switch valve includes a step piston which is displaceable into a first switching position or a second switching position, wherein the second drain of the second cylinder is connected with the supply in the first switching position and the first drain of the first cylinder is connected with the supply in the second switching position, wherein the first cylinder is associated with a first check valve which facilitates feeding the hydraulic fluid into the first cylinder and prevents a draining of the hydraulic fluid from the first cylinder, wherein the second cylinder is associated with a second check valve which facilitates feeding the hydraulic fluid into the second cylinder and prevents a draining of the hydraulic fluid from the second cylinder, wherein the first cylinder and the second cylinder are connected so that the hydraulic fluid is conductible in the second switching position from the first cylinder through the switch valve into the second cylinder directly without throttling.

The object is also achieved by a connecting rod with the switch valve recited supra.

Advantageous embodiments and advantages of the invention can be derived from the dependent claims, the description and the drawing figures.

According to one aspect of the invention a switch valve is proposed for controlling a hydraulic fluid flow of a connecting rod for an internal combustion engine with variable compression with an eccentrical element adjustment arrangement for adjusting an effective connecting rod length, wherein the eccentrical element adjustment arrangement includes a first cylinder and a second cylinder with hydraulic chambers and wherein a respective inlet for feeding hydraulic fluid into the cylinders from a supply as well as a drain for draining the hydraulic fluid from the cylinders is provided. The switch valve includes a step piston which is movable in a housing and optionally displaceable into a first switching position or a second switching position. In the first switching position a drain of the second cylinder is connected with the supply and in the second switching position a drain of the first cylinder is connected with the supply. A respective check valve is associated with the cylinders which facilitates feeding the hydraulic fluid into the cylinders and prevents a draining of the hydraulic fluid from the cylinders. The cylinders are connected so that hydraulic fluid is conductable in the first switching position from the first cylinder into the second cylinder directly without throttling through the switch valve.

The switch valve according to the invention facilitates a hydraulic arrangement during operations of a connecting rod with an eccentrical element adjustment arrangement for adjusting an effective connecting rod length wherein the eccentrical element adjustment arrangement facilitates that the system is provided with a hydraulic preload in a switching position of the internal combustion engine for low compression ($\varepsilon_{low}$). This means that hydraulic flow, e.g., motor oil is conducted from a larger hydraulic chamber on a gas force side (GKS hydraulic chamber) of the adjustable connecting rod directly into a smaller hydraulic chamber on a mass force side (MKS hydraulic chamber). Thus superfluous oil can be drained through a throttling location into the bearing shell.

Simultaneously it can be assured for the switching process from low compression ($\varepsilon_{low}$) to high compression ($\varepsilon_{high}$) that the system is always supplied with a sufficient amount of oil so that the oil pressure does not drop too far. A pressure drop can immediately cause air to gas out from the oil which makes the system lose the hydraulic preload. This could cause a destabilization of the eccentrical element lever system. The switch valve according to the invention avoids that the eccentrical element lever goes through a large amplitude during a revolution of the crankshaft, wherein the large amplitude causes almost undampened impacts of the support piston onto the chamber base or the oil column and eventually causes very high pressure spikes in the system.

Thus, it can be advantageously prevented that the entire inflow from the supply has to be throttled which would also throttle the actuation of the switch valve.

The switch valve is a bi-stable switch which functions with a step piston with two end positions wherein the step piston respectively opens or closes a drain bore hole of the hydraulic chambers. The drain of the MKS hydraulic chamber is thus throttled by the switch valve, the drain of the GKS hydraulic chamber is not throttled. When a gallery pressure of the supply that loads a first pressure surface of the step piston under high compression ($\varepsilon_{high}$) exceeds a particular value, the step piston begins to move. Starting with a predetermined travel of the step piston a second pressure surface is added and the step piston moves into the end position for low compression ($\varepsilon_{low}$). The pressure to shift the step piston back again is much lower than the pressure that was required to move the step piston into the position for low compression ($\varepsilon_{low}$). Thus, a range is generated in which both piston positions can be held in a stable manner and this range is designated as bi-stable range.

In the position for high compression ($\varepsilon_{high}$) the drain bore hole of the MKS hydraulic chamber is connected with the supply. Draining oil from the MKS hydraulic chamber can be received again directly by the GKS hydraulic chamber through the check valve. When the MKS hydraulic chamber volume is smaller than the GKS hydraulic chamber volume, the differential volume of oil is fed again through the supply side check valve. The drain from the MKS hydraulic chamber is provided in a throttled manner in order to limit the adjustment speed from the low compression position ($\varepsilon_{low}$) into the high compression position ($\varepsilon_{high}$).

In the position for high compression ($\varepsilon_{high}$) the drain bore hole of the GKS hydraulic chamber is closed. Leakage oil that can occur at the step piston can drain through bore holes in the typically provided closure covers of the switch valve in a direction towards the tank.

In the position for low compression ($\varepsilon_{low}$) the oil from the GKS hydraulic chamber is conducted through the bore holes in the connecting rod directly and without throttling to the check valve of the MKS hydraulic chamber. This way the energy that results from the pressure forces at the connecting rod can be used and a high pressure potential can be generated in front of the check valve of the hydraulic chamber wherein the pressure is subsequently also provided in the MKS hydraulic chamber, Thus, the MKS hydraulic chamber is hydraulically preloaded and and/or position stability of the connecting rod is increased over the engine operating cycle.

The hydraulic arrangement can be advantageously used e.g., when the GKS hydraulic chamber has a greater volume than the MKS hydraulic chamber. Thus, more oil is available upstream of the check valve of the MKS hydraulic chamber than the MKS hydraulic chamber is capable of receiving. The differential volume of oil can be drained towards the supply through a throttle which prevents an uncontrolled draining of the oil from the GKS hydraulic chamber. Thus, the adjustment velocity of the connecting rod can be limited in a direction towards the low compression position ($\varepsilon_{low}$).

Thus, the switch valve according to the invention includes an additional channel for supplying the MKS hydraulic chamber and is advantageously configured as a 4/2-way valve. The two drain channels of the GKS hydraulic chamber and of the MKS hydraulic chamber are inlet channels of the switch valve which can be switched in the two switching positions optionally to the supply and the inlet of the MKS hydraulic chamber.

According to an advantageous embodiment a chamber volume of the second hydraulic chamber can be smaller than a chamber volume of the first hydraulic chamber, and the second hydraulic chamber can be hydraulically preloadable. For example, the GKS hydraulic chamber can have a larger volume than the MKS hydraulic chamber. Thus, more oil is always available upstream of the check valve of the MKS hydraulic chamber, than the MKS hydraulic chamber can receive. The differential volume of oil can be drained towards the supply through a throttle which prevents unthrottled draining of the oil from the GKS hydraulic chamber. Thus, the adjustment velocity of the connecting rod towards the position for low compression ($\varepsilon_{low}$) can be limited.

According to an advantageous embodiment, the step piston can include tank drain bore holes which are connected with a tank in the first switching position, so that a first pressure surface, in particular a large first pressure surface of the step piston is unloaded from pressure. When the gallery pressure of the supply that is present at a first pressure surface of the step piston at high compression ($\varepsilon_{high}$) exceeds a particular value, the step piston starts to move. Starting with a particular travel of the step piston a second pressure surface is added and the step piston jumps into the end position for low compression ($\varepsilon_{low}$).

According to an advantageous embodiment the tank drain bore holes can be configured as radial bore holes in the step piston, and/or the tank drain bore holes can be distributed over a circumference of the step piston. This facilitates that the switch valve can perform the function of the bi-stable switch which functions with a step piston with two end positions wherein the step piston respectively opens or closes a drain bore hole of the hydraulic chambers. The drain of the MKS hydraulic chamber can thus be performed throttled by the switch valve, the drain of the GKS hydraulic chamber can be performed in a non-throttled manner.

According to an advantageous embodiment, the tank drain bore holes can be connectable with at least one overflow channel in the housing through a circumferential groove. Thus, the oil can drain through the tank drain bore holes unimpeded.

According to an advantageous embodiment, the at least one overflow channel can be connectable with a tank in the first switching position. This way only the first pressure surface is active at the step piston in the first switching position in order to set the step piston in motion.

According to an advantageous embodiment, the at least one overflow channel can be connectable with a supply in the second switching position. This way both pressure surfaces can act at the step piston in the second switching position to move the step piston.

According to an advantageous embodiment, the step piston can be supported by a spiral spring at a closure cover of the housing. Thus, the step piston is mechanically preloaded by the spiral spring and is movable by the hydraulic pressure on the pressure surfaces against the preload, Thus, the function of the bi-stable switch can be implemented.

According to an advantageous embodiment, the closure cover can be connected with the housing by welding or folding over or impressing. This joining method facilitates to advantageously attach the closure cover at the housing of the switch valve.

According to an advantageous embodiment the closure cover can include bore holes which are connected with the tank. Thus, it is possible that leakage oil which occurs at the step piston can drain towards the tank drain easily.

According to an advantageous embodiment, the step piston can be actuatable by a hydraulic pressure on a first pressure surface to move from the first switching position. Thus, the step piston can be put in motion when the hydraulic pressure exceeds a predetermined value that is predetermined by the strength of the spiral spring.

According to an advantageous embodiment, the step piston can be actuable by a hydraulic pressure on the first pressure surface and the second pressure surface to move into the second switching position. Thus, the step piston can jump into its end position in the second switching position when the hydraulic pressure exceeds a predetermined value that is defined by the strength of the spiral spring.

According to an advantageous embodiment, a throttle can be arranged in the drain of the second cylinder. This way the adjustment speed of the connecting rod can be limited in a direction towards low compression ($\varepsilon_{low}$).

According to an advantageous embodiment the switch valve can be configured as a hydraulically actuatable 4/2-valve. Inlet channels of the switch valve are the two drain channels of the GKS hydraulic chamber and the MKS hydraulic chamber which can be optionally switched in the two switching positions to the supply and the inlet of the hydraulic chamber.

According to another aspect of the invention a connecting rod for a variable compression internal combustion engine with an eccentrical element adjustment arrangement is proposed for adjusting an effective connecting rod length. Thus it is possible to use a connecting rod with a switch valve as described supra. The eccentrical element adjustment arrangement includes at least a first cylinder and a second cylinder with hydraulic chambers and a respective inlet is provided for feeding hydraulic fluid into the cylinders from a supply source and a respective drain for draining the hydraulic fluid from the cylinders. The switch valve includes a step piston that is movable in a housing and that is optionally displaceable into a first switching position or a second switching position. In the first switching position the drain of the second cylinder is connected with the supply source and in the second switching position the drain of the first cylinder is connected with the supply source, A check valve is respectively associated with the cylinders which facilitates feeding hydraulic fluid into the cylinders and which prevents a draining of the hydraulic fluid from the cylinders. The cylinders are connected so that hydraulic fluid is conductible in the second switching position from the first cylinder into the second cylinder directly through the switch valve without throttling.

This facilitates an advantageous combustion process and thus low fuel burn in the internal combustion engine.

BRIEF DESCRIPTION OF THE DRAWINGS

Further advantages can be derived from the subsequent drawing description. The drawing illustrate an embodiment of the invention. The drawings, the description and the claims include several features in combination. A person skilled in the art will advantageously view the features also individually and will combine them into additional useful combinations, wherein:

DETAILED DESCRIPTION OF THE INVENTION

In the drawing figures identical or like components are labelled with identical reference numerals. The figures only illustrate exemplary embodiments and do no limit and scope of the invention.

Figure 1:
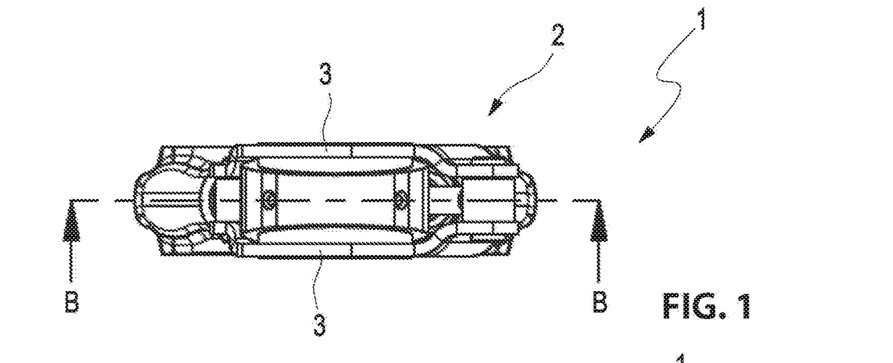
FIG. 1 illustrates a top view of the connecting rod according to the invention showing a sectional plane B-B.
Figure 2:
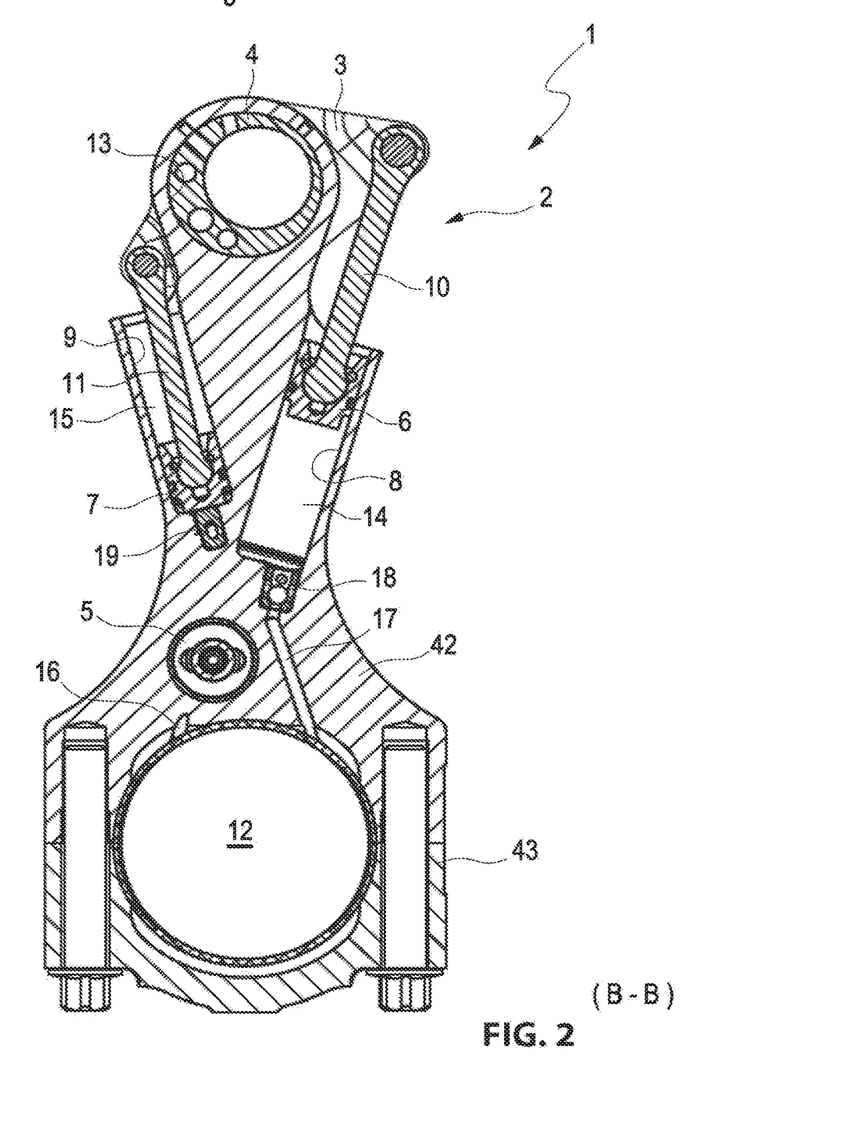
FIG. 2 illustrates a longitudinal sectional view along the sectional plane B-B through the connecting rod according to FIG. 1.

The connecting rod 1 for a variable compression internal combustion engine is illustrated in an exemplary manner in FIGS. 1 (top view) and 2 (longitudinal sectional view in the sectional plane B-B). The connecting rod according to the invention has an eccentrical element adjustment arrangement 2 for adjusting an effective connecting rod length which is defined as a distance of a center axis of a lift bearing eye 12 from a center axis of the bore hole of an eccentrical element 4 arranged in a connecting rod bearing eye 13. The eccentrical element adjustment arrangement 2 includes the eccentrical element 4 that cooperates with a single component or multiple component eccentric element lever 3 in which a non-illustrated wrist pin of a cylinder piston is received. The adjustment travel of the eccentrical element adjustment arrangement 2 is hydraulically adjustable by the switch valve 5.

The switch valve 5 is used for controlling a hydraulic fluid flow of the connecting rod 1 with the eccentrical element adjustment arrangement 2 for adjusting an effective connecting rod length. Thus, the eccentrical element adjustment arrangement includes at least a first cylinder and a second cylinder with hydraulic chambers 14, 15. Thus, a respective inlet 16, 17 for feeding hydraulic fluid into the cylinders from a supply P as well as a drain 20, 21 for draining the hydraulic fluid from the cylinders is provided. The switch valve 5 includes a step piston 28 that is movable in a housing 34 wherein the step piston is optionally displaceable into a first switching position S1 or a second switching position S2. In the first switching position S1 the drain 21 of the second cylinder is connected with the supply P and in the second switching position S2 the drain 20 of the first cylinder is connected with the supply P. A check valve 18, 19 is respectively associated with the cylinders which facilitates feeding hydraulic fluid into the cylinders and prevents draining the hydraulic fluid from the cylinders. The cylinders are connected so that hydraulic fluid is conductable in the second switching position S2 from the first cylinder into the second cylinder directly and without throttling through the switch valve 5.

A chamber volume of the second hydraulic chamber 15 is smaller than a chamber volume of the first hydraulic chamber 14 so that the second hydraulic chamber 15 is hydraulically preloadable.

A relative rotation of the adjustable eccentrical element adjustment arrangement 2 is initiated by an impact of mass forces (designated in FIGS. 12 and 13 as $F_M$) and gas load forces (designated as $F_G$ in FIGS. 12 and 13) of the internal combustion engine which impact the eccentrical element adjustment arrangement 2 during an operating stroke of the internal combustion engine. During an operating stroke effective directions of the forces impacting the eccentrical element adjustment arrangement 2 change continuously. The rotation or adjustment motion is supported by one or plural pistons 6, 7 that are loaded with the hydraulic fluid, in particular motor oil, and integrated in the connecting rod, or the pistons 6,7 prevent a resetting of the eccentrical element adjustment arrangement due to varying force impact directions of forces impacting the eccentrical element adjustment arrangement 2.

The pistons 6, 7 are respectively movably supported in cylinder bore holes 8, 9 of hydraulic cylinders of the connecting rod 1 and connected with support rods 10, 11 which in turn are pivotably linked with the eccentrical element lever 3.

The connecting rod 1 includes a crank bearing eye 12 for attaching the connecting rod 1 to a crankshaft of an internal combustion engine and a connecting rod bearing eye 13 for connecting the connecting rod 1 with the cylinder piston of the internal combustion engine.

The pistons 6, 7 are movably supported in hydraulic chambers 14, 15 formed by the cylinder bore holes 8, 9 and loaded through inlets 16, 17 from the crank bearing eye 12 with hydraulic fluid, e.g., motor oil through check valves 18, 19. The check valves thus prevent a flowback of the hydraulic fluid from the hydraulic chambers, 14, 15 into the inlets 16, 17, however facilitate pulling hydraulic fluid into the hydraulic chambers 14, 15.

Figure 12:
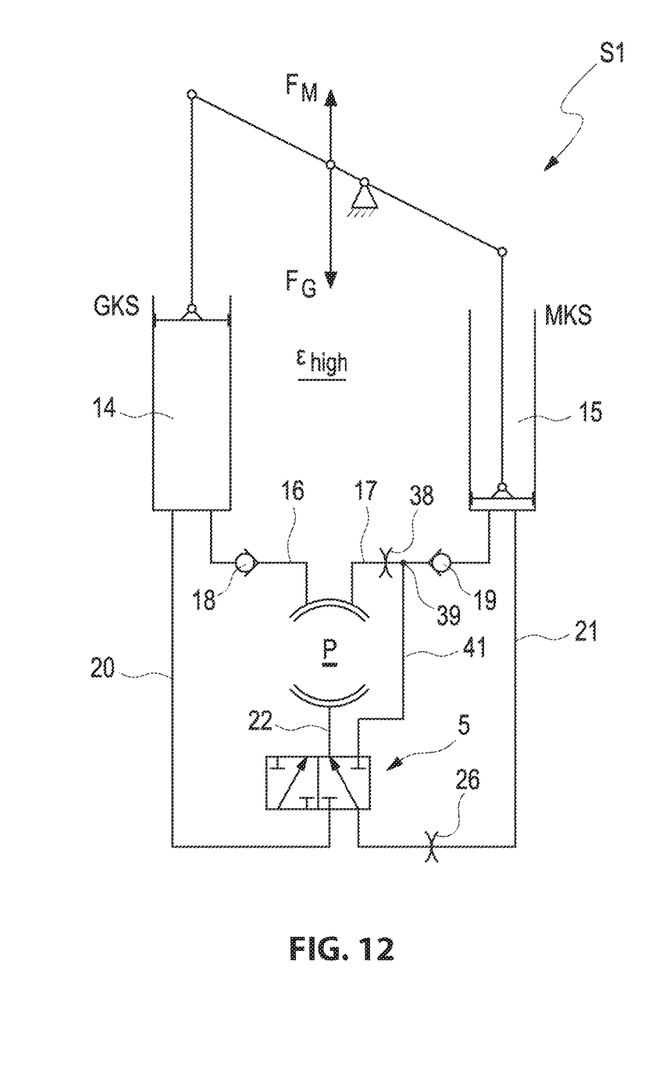
FIG. 12 illustrates a hydraulic diagram of the connecting rod according to the invention with the switch valve according to FIGS. 3-11 in the first switching position.
Figure 13:
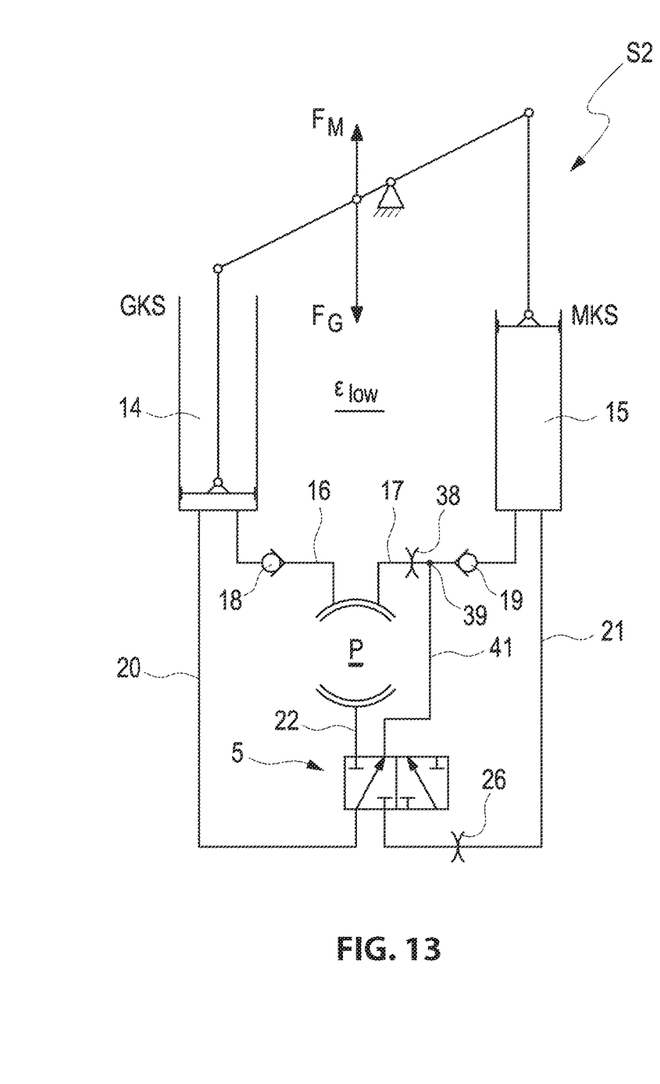
FIG. 13 illustrates the hydraulic diagram of the connecting rod according to the invention with the switch valve according to FIGS. 3-11 in the second switching position.

The hydraulic chambers 14, 15 are connected with the switch valve 5 through drains 20, 21 that are illustrated in the hydraulic diagrams of the connecting rod 1 in FIGS. 12 and 13 wherein the switch valve is configured as a hydraulic valve and connected through a drain conduit 22 with the crank bearing eye 12 or a bearing shell.

As evident for example from FIG. 2 the connecting rod 1 includes a connecting rod body 42 and a connecting rod cover 43 attached thereto.

The cylinder bore hole 8 represents the hydraulic chamber 14 on the gas force side (GKS) of the connecting rod 1, whereas the cylinder borehold 9 represents the hydraulic chamber 15 on the mass force side (MKS) of the connecting rod 1.

Figure 3:
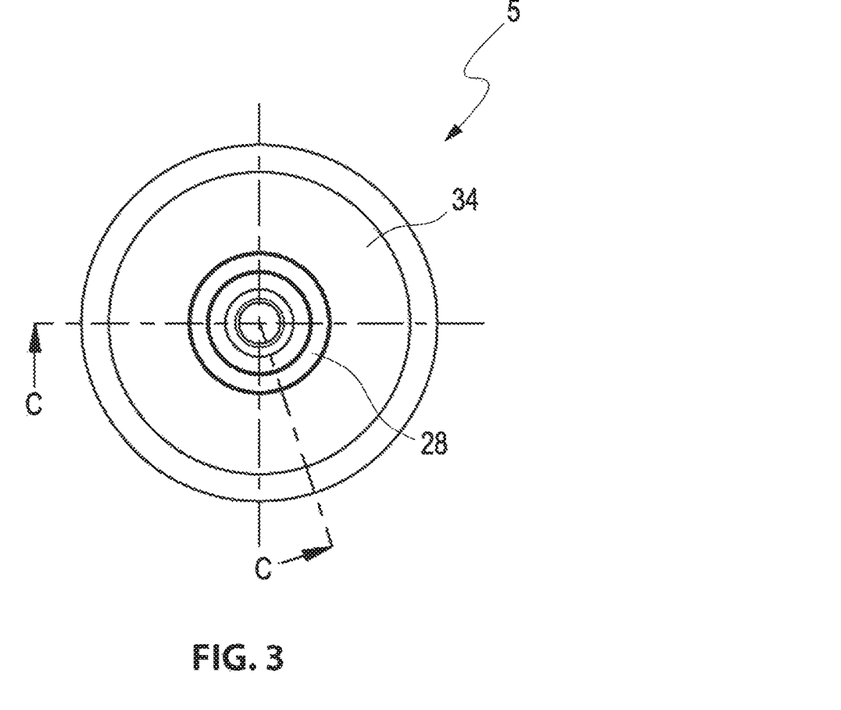
FIG. 3 illustrates a first side view of the check valve according to the invention showing a sectional plane C-C.
Figure 4:
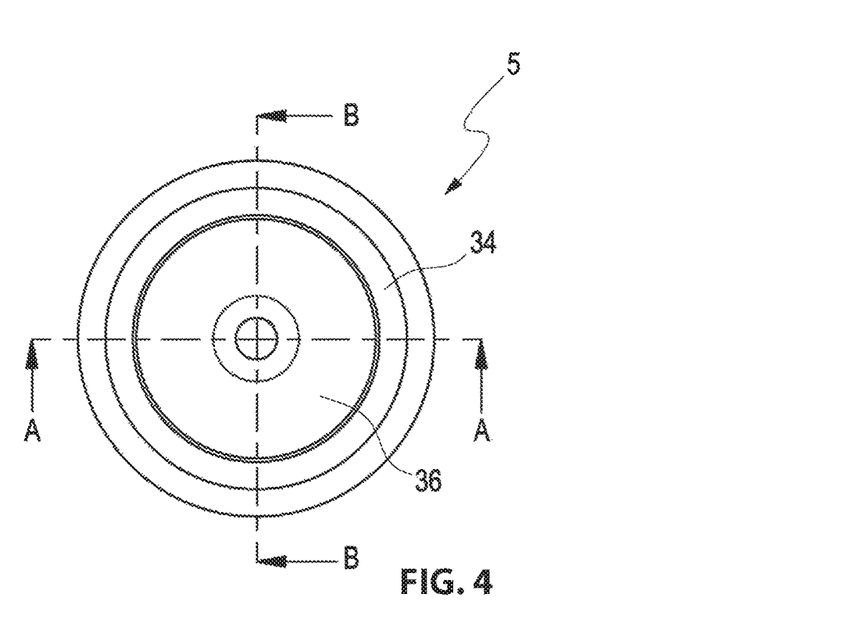
FIG. 4 illustrates a second side view of the switch valve according to FIG. 1 showing the sectional planes A-A and B-B.
Figure 5:
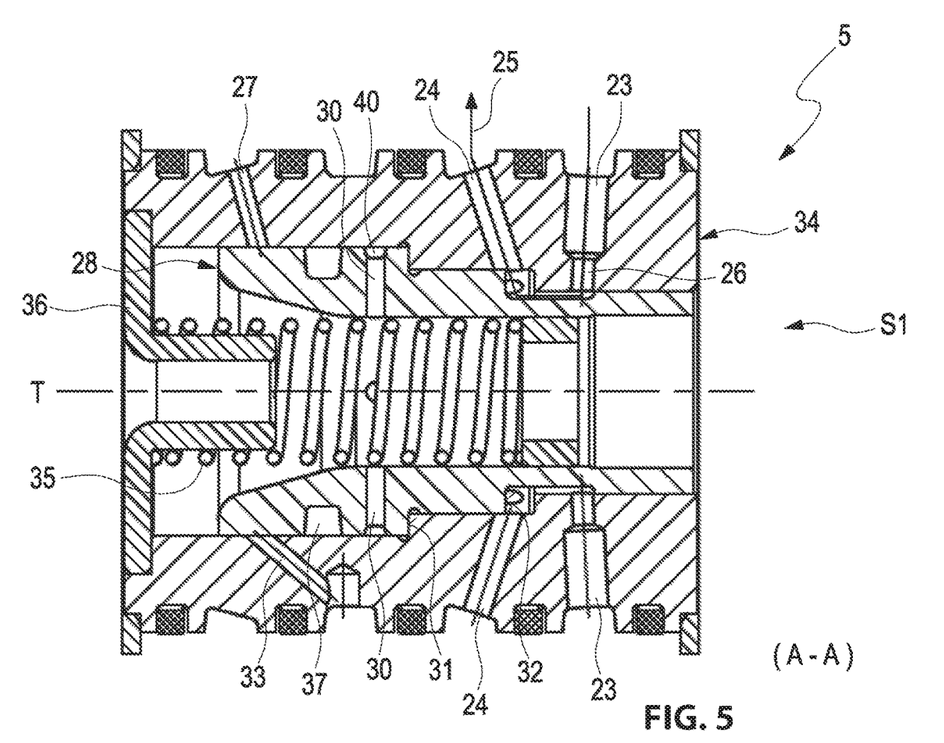
FIG. 5 illustrates a longitudinal sectional view along the sectional plane A-A of the switch valve according to FIG. 4 in the first switching position.
Figure 6:
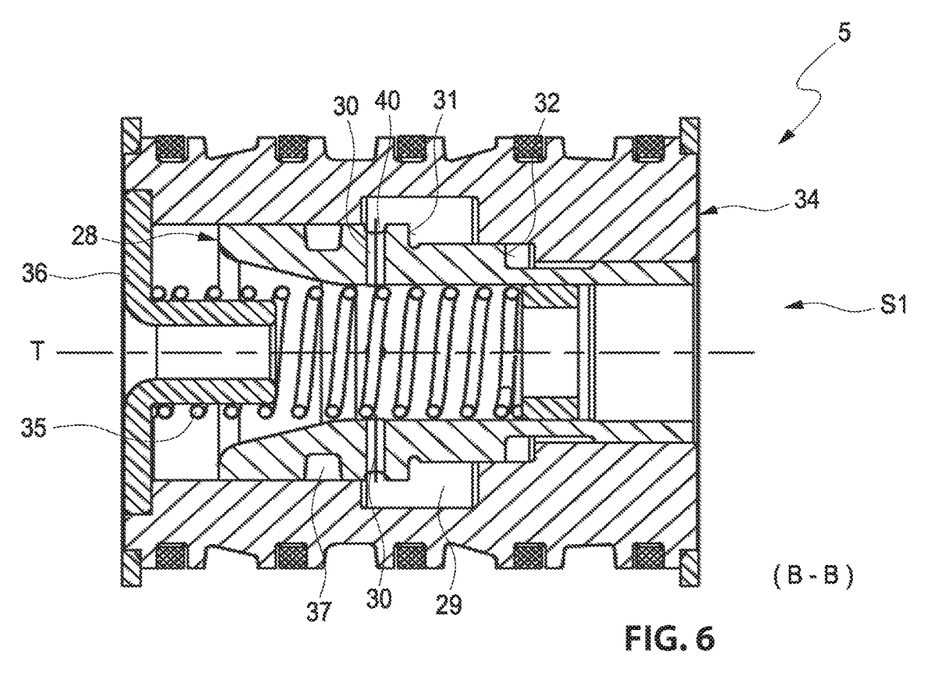
FIG. 6 illustrates a longitudinal sectional view along the sectional plane B-B of the switch valve according to FIG. 4 in a first switching position.
Figure 7:
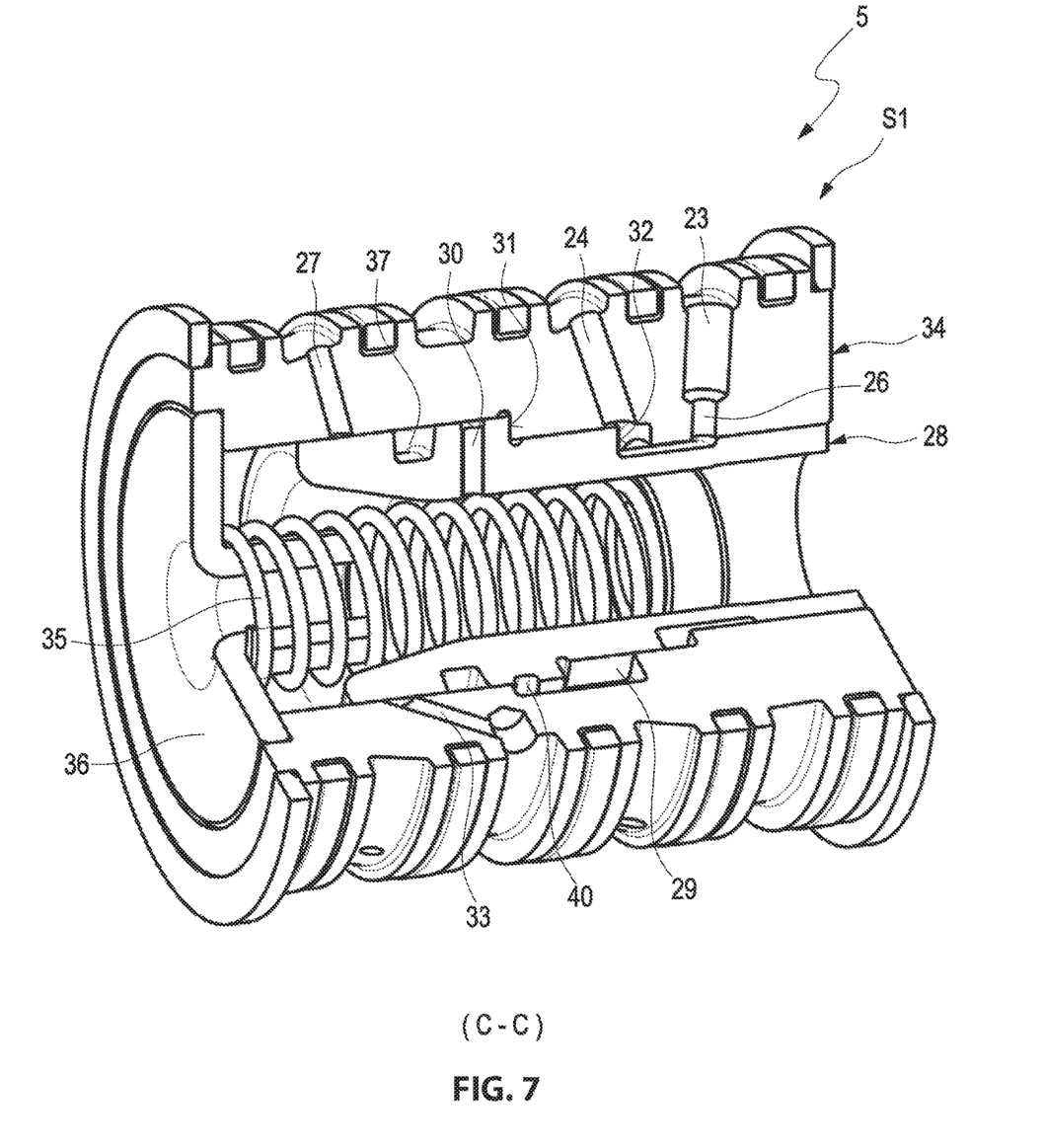
FIG. 7 illustrates an isometric partial sectional view along the sectional plane C-C of the switch valve according to FIG. 3 in the first switching position.
Figure 8:
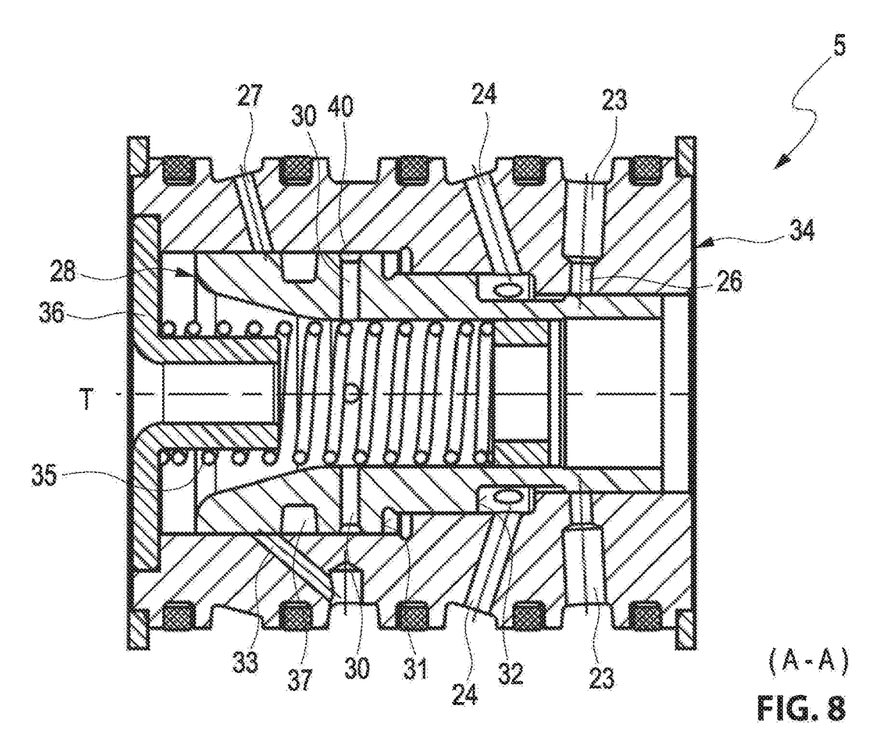
FIG. 8 illustrates the longitudinal sectional view along the sectional plane A-A of the switch valve according to FIG. 4 at a switching threshold.
Figure 9:
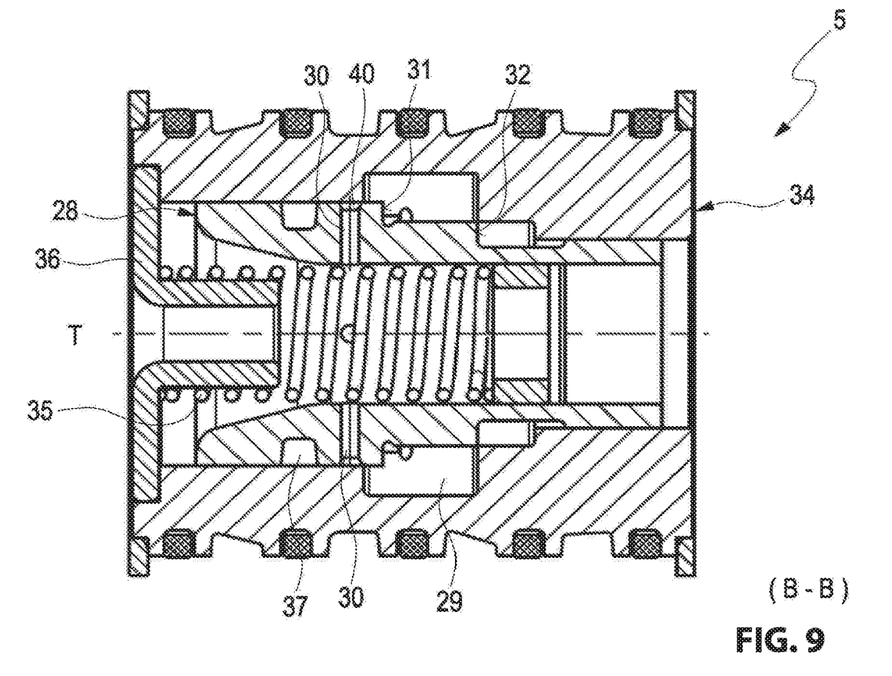
FIG. 9 illustrates the longitudinal sectional view along the sectional plane B-B of the switch valve according to FIG. 4 at a switching threshold.
Figure 10:
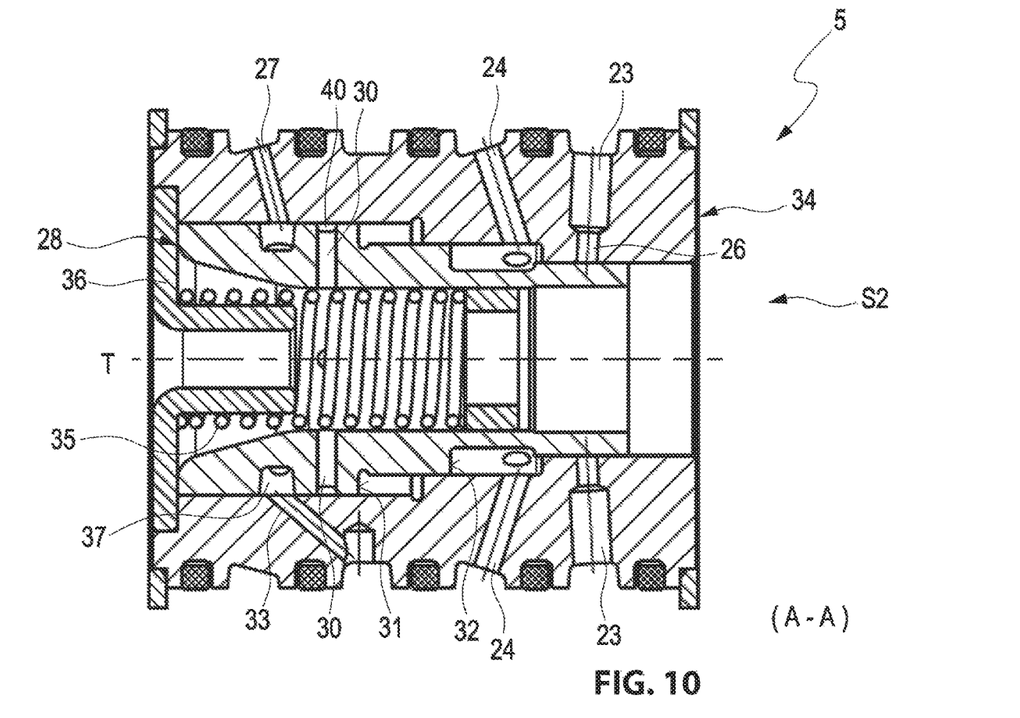
FIG. 10 illustrates the longitudinal sectional view along the sectional plane A-A of the switch valve according to FIG. 4 in a second switching position.
Figure 11:
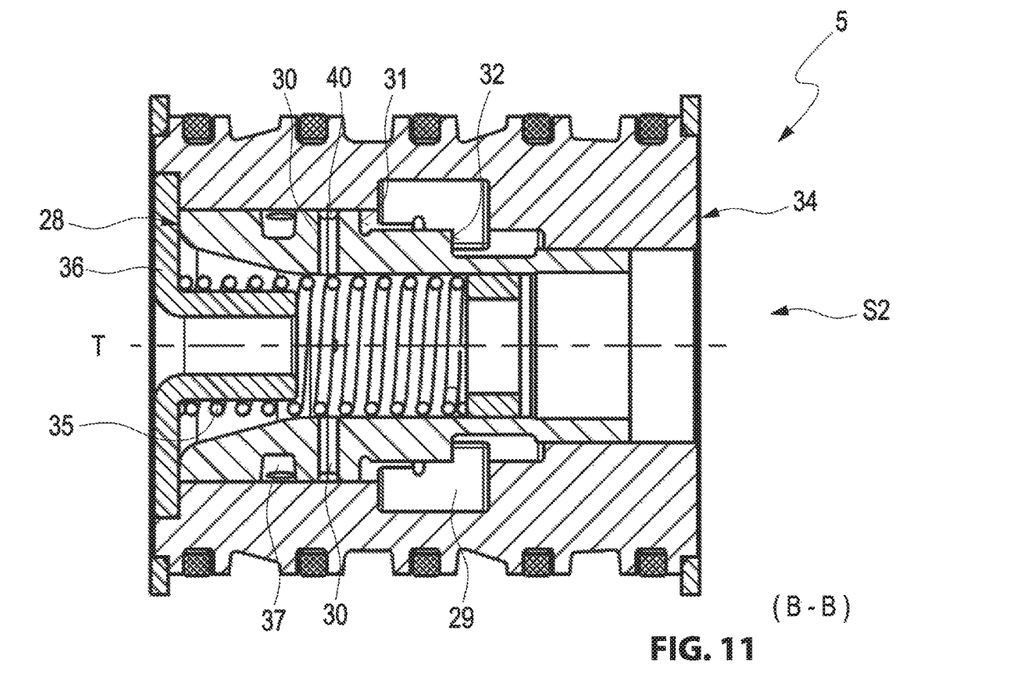
FIG. 11 illustrates the longitudinal sectional view along the sectional plane B-B of the switch valve according to FIG. 4 in a second switching position.

FIGS. 3-11 illustrate a switch valve 10 according to the invention in various representations and sectional views. Thus, FIGS. 5 through 7 illustrate the switch valve 5 in a first switching position S1 for high compression ($\varepsilon_{high}$) and FIGS. 10 and 11 illustrate the switch valve 5 in the second switching position for low compression ($\varepsilon_{low}$) FIGS. 8 and 9 illustrate the sectional views at a switching threshold between the two switching positions. Corresponding hydraulic diagrams of a connecting rod 1 according to the invention can be derived from the FIGS. 12 and 13.

FIG. 3 illustrates a first side view of the switch valve 5 with indicated sectional plane C-C, FIG. 4 illustrates a second side view with indicated sectional planes A-A and B-B. FIGS. 5 and 6 illustrated the corresponding longitudinal sectional views A-A and B-B, whereas FIG. 7 illustrates a partial sectional isometric view with the sectional view C-C.

In the switching position S1 of the connecting rod 1 ($\varepsilon_{high}$) the GKS hydraulic chamber 14 is filled with hydraulic fluid/oil and the MKS hydraulic chamber 15 is connected through the drain 21 and the switch valve 4 in a throttled manner with a supply source P or with the bearing shell of the connecting rod 1.

One or plural MKS drain bore holes 23 of the switch valve 5 are connected with one or plural supply bore holes 24, as indicated by the arrow 25 of the hydraulic fluid flow in FIG. 5. Thus, a throttle 26 is configured in the switch valve 5 as a diameter contraction of the drain bore whole 23. The drain bore hole 23 is connected with the drain 21 of the MKS hydraulic chamber when the switch valve 5 is installed into the connecting rod 1. Draining oil from the MKS hydraulic chamber can be received again by the GKS hydraulic chamber 14 through the check valve 18 directly from the supply source P.

One or plural GKS drain bore holes 27 are closed by a step piston 28 of the switch valve 5 that is arranged longitudinally movable in the housing 34. An MKS inlet bore hole 33 is also closed by the step piston 28.

The step piston 28 is preloaded towards a first right side end position by a spiral spring 35, which is supported at closure lid 36 of the housing 34. The closure lid 36 itself can be connected with the housing 34 through welding or folding over or impressing or a similar suitable joining method. The closure lid 36 furthermore includes non-illustrated bore holes which are connected with the tank T so that leakage oil can drain from the step piston 28.

The basic function of the switch valve 5 which is hydraulically actuatable is already known from DE 10 2013 107 127 A1.

As evident from the sectional view B-B in FIG. 6, overflow channels 29 connected with the supply source P are unloaded through radial tank drain bore holes 30 in a direction towards a tank T so that leakage oil, which can occur at the step piston 28 can drain through one or plural bore holes in a closure cover 36. Thus, no pressure impacts a large anular pressure surface 31 of the step piston 28. Only a small anular pressure surface 32 is impacted by the hydraulic pressure of the supply source P so that the step piston 28 cannot be moved against the force the spiral spring 35 into a second end position.

The tank drain bore holes 30 are configured as radial bore holes in the step piston 28. Advantageously the tank drain bore holes 30 are arranged distributed over the circumference of the step piston 28. The tank drain bore holes 30 are furthermore hydraulically connectable with at least one overflow channel 29 in the housing 34 through a circumferential groove 40.

FIGS. 8 and 9 illustrate longitudinal sectional views along the sectional plane A-A and B-B according to FIG. 4 of the switch valve 5 at a switching threshold. FIGS. 10 and 11 illustrate corresponding longitudinal sectional views of the switch valve 5 in the second switching position S2.

At the switching threshold illustrated in FIGS. 8 and 9 the tank drain bore holes 30 are arranged outside of the overflow channels 29 so that pressure can also build up at the large pressure surface 31 and the step piston 28 can leap into its second end position towards the left. The switch valve 5 is then arranged in its second switching position S2 for low compression ($\varepsilon$low) which is illustrated in FIGS. 10 and 11. The corresponding position of the connecting rod 1 is evident from FIG. 2 and from the schematic according to FIG. 13.

In this position the GKS hydraulic chamber 14 pressed its oil through the switch valve 5 directly without throttling in front of the MKS check valve 19. The GKS drain bore holes 27 are thus connected with the MKS inlet bore hole 33 through a ring channel 37 in the step piston 28. The MKS drain bore holes 23 are closed. Both pressure surfaces 31, 32 are arranged in a portion of the overflow channels 29 and thus pressure loaded. The tank drain bore holes 30 are also closed.

Since the GKS hydraulic chamber 14 has a larger chamber volume than the MKS hydraulic chamber 15, a superfluous volume flow is conducted in a direction towards the supply source P, e.g. a bearing shell of the connecting rod 1 through a throttle 38. The pressure thus created is substantially higher than the supply pressure when the throttle 38 is correctly sized and is also applied according to the instant invention in front of the check valve 19 of the MKS hydraulic chamber 15, which assures safe filling of the MKS hydraulic chamber 15. This provides the hydraulic preload. Simultaneously the throttle 38 causes a limitation of the speed at which the GKS piston 6 impacts the base of the GKS hydraulic chamber 8. In order to hydraulically preload the MKS hydraulic chamber 15 in the switching position ($\varepsilon$low) it is important that the throttle 38 is arranged downstream of a branch off point 39 (c.f. FIG. 13) of the MKS hydraulic chamber check valve 19 in a volume flow that is pushed out from the GKS hydraulic chamber 14 in a direction towards the supply source P. Thus, the throttle 38 is arranged between the branch of point 39 and the supply P.

The hydraulic pressure that is required to shift the step piston 28 back into the first switching position S1 is much lower than the pressure that is required to move the step piston 28 into the second switching position S2. This hysteresis generates a hydraulic pressure range in which both piston positions are held in a stable manner. The switch valve according to the invention thus represents a bi-stable switch valve.

FIGS. 12 and 13 illustrate a hydraulic diagram of the connecting rod 1 according to the invention with the switch valve 5 according to FIGS. 3 through 11 in the first switching position S1 and in the second switching position S2.

As evident from FIGS. 12 and 13 the illustrated and described switch valve 5 is configured as a 4/2 way valve. The two drain channels 20, 21 of the GKS hydraulic chamber 14 or of the MKS hydraulic chamber 15 are inlet channels of the switch valve 5, wherein the two inlet channels can be optionally switched in the two switching positions S1 and S2 to the supply source P and the inlet 41 of the MKS hydraulic chamber 15.

In the switching position of the switch valve 5 illustrated in FIG. 12 the connecting rod 1 is in the switching positon S1 for high compression ($\varepsilon_{high}$). In this operating condition the GKS hydraulic chamber 14 is filled with hydraulic fluid/oil and the MKS hydraulic chamber 15 is connected through the drain 21 and through the switch valve 5 in a throttled manner with a supply P or with the bearing shell of the connecting rod 1.

The step piston 28 of the switch valve 5 as illustrated e.g. in FIG. 6 includes tank drain bore holes 30 which are connected in the first switching position S1 with the tank T so that a first pressure surface 31, in particular a large first pressure surface 31 of the step piston 28 is unloaded from pressure. Thus, in the first switching position S1 the at least one overflow channel 29 is connected with the tank T. Thus, the step piston 28 can be moved out by the hydraulic pressure on the first pressure surface 31 in that the hydraulic pressure bridges the pre-load force of the spiral spring 35. The step piston 28 can be moved into the second switching position S2 by the hydraulic pressure on the first pressure surface 31 and a second pressure surface 32.

In the switching position of the switch valve 5 that is illustrated in FIG. 13 the connecting rod 1 is in the switching position S2 for low compression ($\varepsilon_{low}$). In this operating position the GKS hydraulic chamber 14 is connected through the drain 20 and through the switch valve 5 and the inlet 41 with the MKS hydraulic chamber 15 and therefore the MKS hydraulic chamber is filled with hydraulic fluid/oil. In the second switching position S2 the at least one overflow channel 29 is connected with the supply P.

What is claimed is:

1. A switch valve for controlling a hydraulic fluid flow of a connecting rod for an internal combustion engine with variable compression with an eccentrical element adjustment arrangement for adjusting an effective connecting rod length, the eccentrical element adjustment arrangement comprising: a first cylinder including a first hydraulic chamber; a second cylinder including a second hydraulic chamber, wherein the first cylinder includes a first inlet for feeding hydraulic fluid into the first cylinder from a supply and the second cylinder includes a second inlet for feeding hydraulic fluid into the second cylinder from the supply, wherein the first cylinder includes a first drain for draining the hydraulic fluid from the first cylinder and the second cylinder includes a second drain for draining the hydraulic fluid from the second cylinder, wherein the switch valve includes a step piston which is displaceable into a first switching position or a second switching position, wherein the second drain of the second cylinder is connected with the supply in the first switching position and the first drain of the first cylinder is connected with the supply in the second switching position, wherein the first cylinder is associated with a first check valve which facilitates feeding the hydraulic fluid into the first cylinder and prevents a draining of the hydraulic fluid from the first cylinder, wherein the second cylinder is associated with a second check valve which facilitates feeding the hydraulic fluid into the second cylinder and prevents a draining of the hydraulic fluid from the second cylinder, wherein the first cylinder and the second cylinder are connected so that the hydraulic fluid is conductible in the second switching position from the first cylinder through the switch valve into the second cylinder directly without throttling, and wherein a chamber volume of the second hydraulic chamber is smaller than a chamber volume of the first hydraulic chamber and the second hydraulic chamber is hydraulically preloadable.

2. The switch valve according to claim 1, wherein the step piston includes tank drain bore holes which are connected with a tank in the first switching position so that a large first pressure surface of the step piston is unloaded from pressure.

3. The switch valve according to claim 2,
wherein the tank drain bore holes are configured as radial bore holes in the step piston, and
wherein the tank drain bore holes are distributed over a circumference of the step piston.

4. The switch valve according to claim 2, wherein the tank drain bore holes are connectable with at least one overflow channel in a housing of the check valve by a circumferential groove.

5. The switch valve according to claim 4, wherein the at least one overflow channel is connectable with the tank in the first switching position.

6. The switch valve according to claim 4, wherein the at least one overflow channel is connectable with the supply in the second switching position.

7. The switch valve according to claim 1, wherein the step piston is supported by a coil spring at a closure cover of a housing of the switch valve.

8. The switch valve according to claim 7, wherein the closure cover is connected with the housing through welding or folding over or impressing.

9. The switch valve according to claim 7, wherein the closure cover includes bore holes which are connected with the tank.

10. The switch valve according to claim 1, wherein step piston is movable from the first switching position by a hydraulic pressure on a first large pressure surface.

11. The switch valve according to preceding claim 10, wherein the step piston is movable by a hydraulic pressure on the first large pressure surface and a second pressure surface into the second switching position.

12. The switch valve according to claim 1, wherein a throttling location is arranged in the second drain of the second cylinder.

13. A connecting rod for a variable compression internal combustion engine with an eccentrical element adjustment arrangement for adjusting an effective connecting rod length with the switch valve according to claim 1.

14. A switch valve for controlling a hydraulic fluid flow of a connecting rod for an internal combustion engine with variable compression with an eccentrical element adjustment arrangement for adjusting an effective connecting rod length, the eccentrical element adjustment arrangement comprising: a first cylinder including a first hydraulic chamber; a second cylinder including a second hydraulic chamber, wherein the first cylinder includes a first inlet for feeding hydraulic fluid into the first cylinder from a supply and the second cylinder includes a second inlet for feeding hydraulic fluid into the second cylinder from the supply, wherein the first cylinder includes a first drain for draining the hydraulic fluid from the first cylinder and the second cylinder includes a second drain for draining the hydraulic fluid from the second cylinder, wherein the switch valve includes a step piston which is displaceable into a first switching position or a second switching position, wherein the second drain of the second cylinder is connected with the supply in the first switching position and the first drain of the first cylinder is connected with the supply in the second switching position, wherein the first cylinder is associated with a first check valve which facilitates feeding the hydraulic fluid into the first cylinder and prevents a draining of the hydraulic fluid from the first cylinder, wherein the second cylinder is associated with a second check valve which facilitates feeding the hydraulic fluid into the second cylinder and prevents a draining of the hydraulic fluid from the second cylinder, wherein the first cylinder and the second cylinder are connected so that the hydraulic fluid is conductible in the second switching position from the first cylinder through the switch valve into the second cylinder directly without throttling, and wherein the switch valve is configured as a hydraulically actuatable 4/2-way valve.

* * * * *